Figure 5:
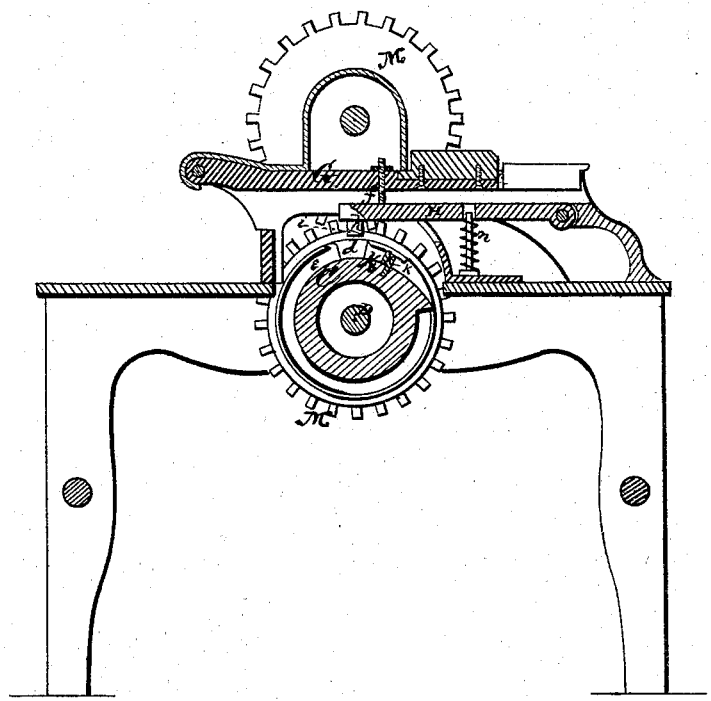

C. T. MOORE.
Type-Setting Machines.
No. 137,466. Patented April 1, 1873.
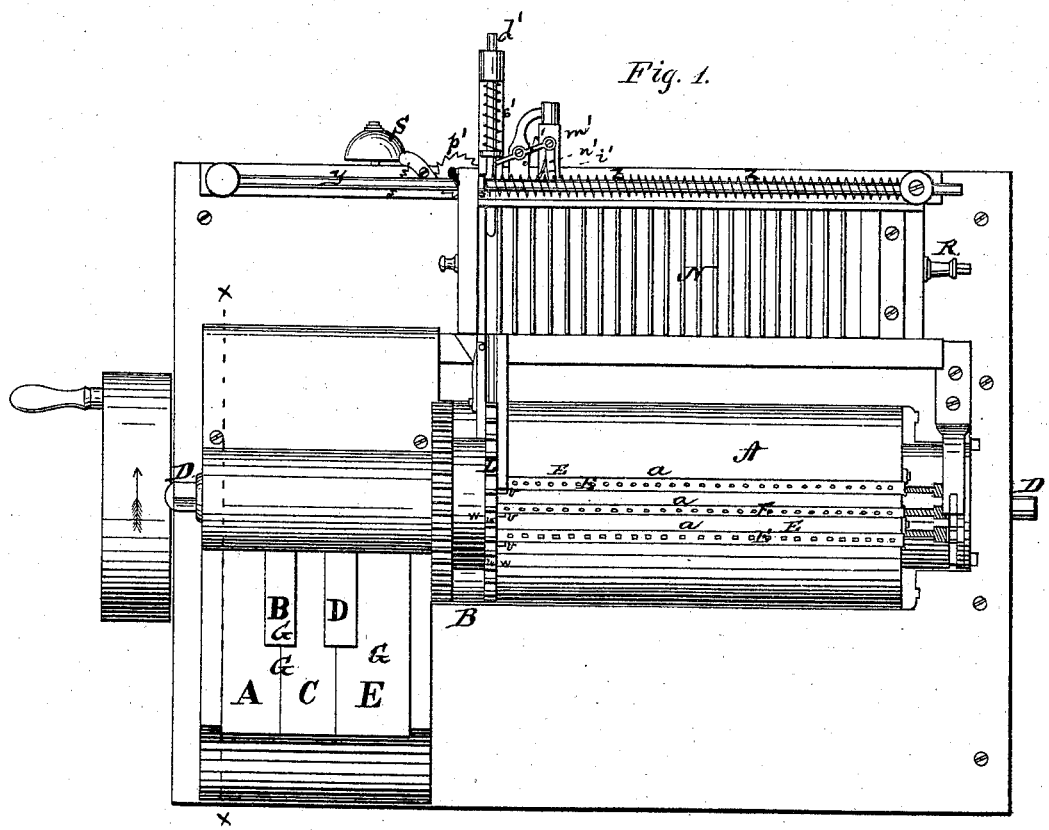
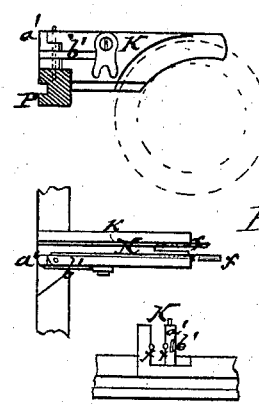
Witness:
Henry N. Miller
C. L. Evert
Inventor.
Chas. T. Moore,
per
Alexander Mason
Attorneys.

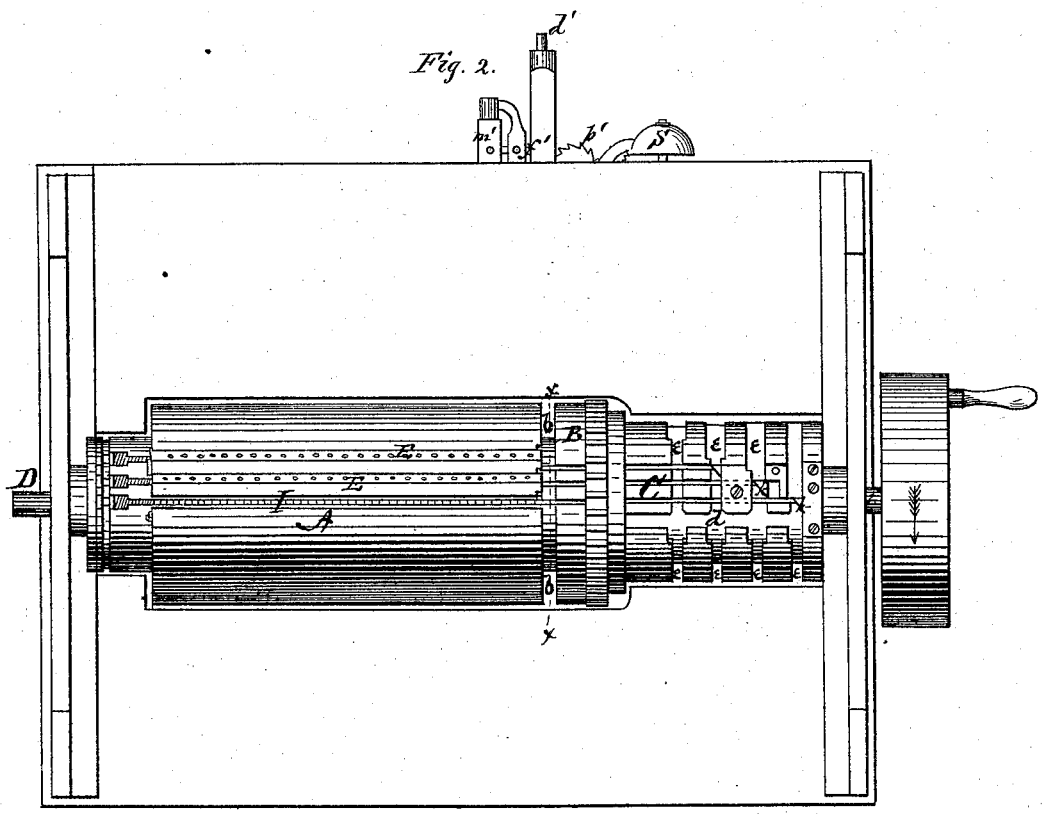

4 Sheets--Sheet 3.
C. T. MOORE.
Type-Setting Machines.
No. 137,466. Patented April 1, 1873.
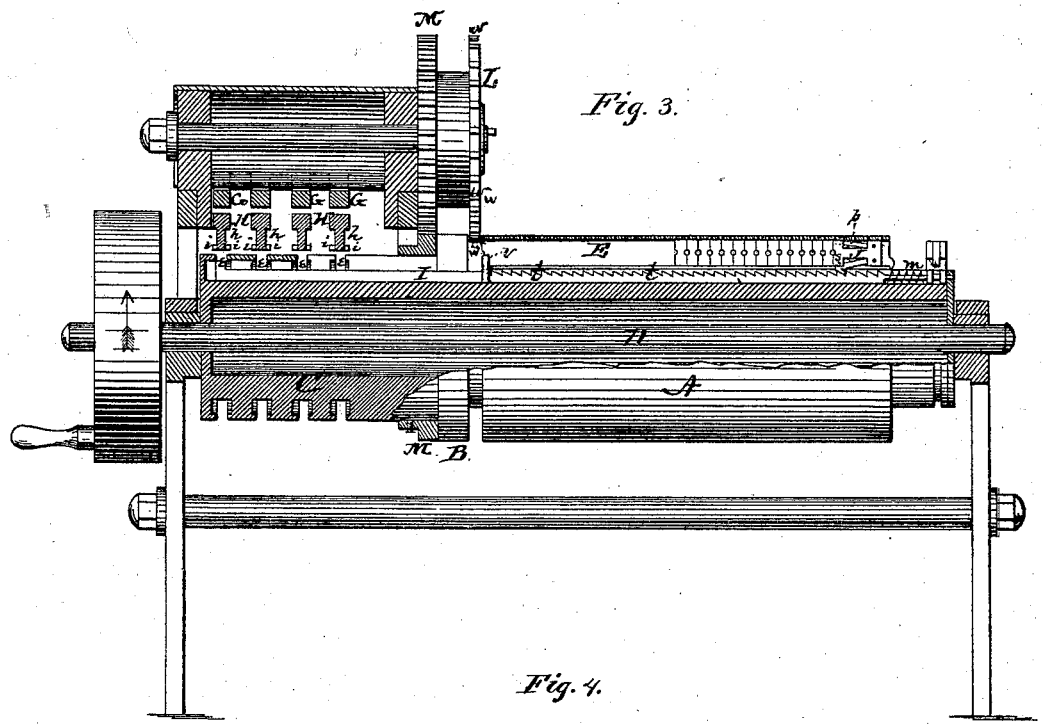
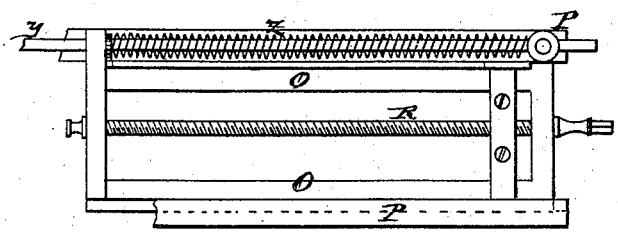

4 Sheets--Sheet 4.

C. T. MOORE.
Type-Setting Machines.

No. 137,466.             Patented April 1, 1873.

Witness:
Henry N. Miller
C. L. Evert

Inventor.
Chas. T. Moore
per
Alexander H. Mason
*Attorneys.*

AM. PHOTO-LITHOGRAPHIC CO. N.Y. (OSBORNE'S PROCESS.)

UNITED STATES PATENT OFFICE.

CHARLES T. MOORE, OF WHITE SULPHUR SPRINGS, ASSIGNOR OF ONE-HALF HIS RIGHT TO THOMAS L. FEAMSTER, OF LEWISBURG, W. VA.

IMPROVEMENT IN TYPE-SETTING MACHINES.

Specification forming part of Letters Patent No. 137,466, dated April 1, 1873; application filed May 28, 1872.

*To all whom it may concern:*

Be it known that I, CHARLES T. MOORE, of White Sulphur Springs, in the county of Greenbrier and in the State of West Virginia, have invented certain new and useful Improvements in Type-Setting Machines; and do hereby declare that the following is a full, clear, and exact description thereof, reference being had to the accompanying drawing and to the letters of reference marked thereon making a part of this specification.

The nature of my invention consists in the construction and arrangement of a type-setting machine, as will be hereinafter more fully set forth.

In order to enable others skilled in the art to which my invention appertains to make and use the same, I will now proceed to describe its construction and operation, referring to the annexed drawing, in which—

Figure 1 is a plan view, Fig. 2 a bottom view, and Fig. 3 a longitudinal section, of my machine. Fig. 4 is a plan view of the movable bed for the form. Fig. 5 is a section of the key-board through line x x, Fig. 1. Fig. 6 represents the guide through which the type passes into the form. Fig. 7 represents the follower in the type-box. Fig. 8 is a view of the ratchet-bar for operating the follower in the type-box. Fig. 9 is a view of the type-box. Fig. 10 is a transverse section of the type-box and type, and Fig. 11 is a transverse section of the main cylinder taken through the line x x, Fig. 2.

The main part of my machine, or the part in which the types are placed, consists of a hollow cylinder, marked A B C, of varying thickness or diameter, and placed upon a central shaft, D, which passes through the center of the heads of the cylinder, or is connected with the cylinder by arms or other suitable means. The parts A and B of the cylinder are of the same thickness or diameter, while the part C is smaller, as shown in Figs. 1 and 2. The part A is provided with a series of longitudinal grooves, *a a*, corresponding in number with the letters and characters to be used. These grooves are of suitable depth and width to receive type-boxes E, in which the type stand upright, said type-boxes being inserted in the grooves from the end of the cylinder, and extend up to the other edge of the part A. The parts A and B are divided by a circumferential groove, *b*, of the same depth as the grooves *a a*, and wide enough for a type to stand in. The part C is provided with one comparatively wide longitudinal groove, *d*, and a series of circumferential grooves, *e e*, corresponding in number with the longitudinal grooves *a a* of the part A. Above the part *c* of the cylinder is a key-board, constructed in any suitable manner and containing a series of keys, G G, corresponding in number with the number of letters or characters to be used, or, in other words, corresponding with the grooves *a a* and *e e*, there being one key above each groove *e*. Each key is, on its under side, provided with a lug, *f*, which strikes the rear end of a bar, H, pivoted at its front end, as shown in Fig. 5. This bar is, at its rear end on the under side, provided with a lug, *h*, having flanges at its lower end on both sides, as shown in Fig. 2, which makes the lower end of said lug *h* wider than the groove *e*; and hence when the key is struck the lug will not enter the same until, by the revolution of the cylinder, the longitudinal groove *d* comes under the lug *h*, when said lug will come down into the same, and then enter the groove *e*, there being guide-grooves in said groove *e* corresponding with the flanges *i i*. The cylinder revolving at the rate of about two hundred or more revolutions per minute, it will be seen that this movement is almost instantaneous. In the bottom of each of the grooves *a* is a narrower groove, extending through the parts A and B, and into the part C as far as the circumferential groove *e* corresponding with said groove *a*. In this groove is placed a bar or rod, I, for feeding the type. This bar is, at the end in the groove E, provided with a projection, *k*, inclined as shown on Plate 2, so that the lug *h*, after having entered the groove *e*, will strike the projection *k* and move the bar I a sufficient distance to feed one type. In the side of the groove *s*, opposite the end of the bar I, is made a recess, as shown in Fig. 3, to allow of said movement of the bar I. As soon as the lug *h* has cleared the projection $k$, a spring, $m$, at the other end of the bar I, throws the bar back again in its former position; and notches being made in the sides of the groove $e$, immediately beyond the point where the projection $k$ is located, a spring, $n$, under the bar H throws or raises the lug $h$ out of said groove. The type box or case E is constructed as shown in Figs. 9 and 10, the bottom being open, and with a longitudinal rib, $o$, on one or both sides. The top of this box is provided with a series of holes or perforations, the distances between the same being equal to the thickness of the type to be placed therein. In the sides of the grooves $a$ $a$ are made grooves corresponding with the ribs $o$ $o$ in the type-boxes, which thus prevent said boxes from falling out during the rotation of the cylinder. In the rear end of each type-box E is placed a follower, J, with a spring-pawl, $p$, working in its upper side, which goes into the holes or perforations in the top of the type-box. On the under side of the follower J is a spring-pawl, $s$, which engages with a series of teeth, $t$, formed in the upper surface of the feed-bar I. These teeth extend the entire length of the groove $a$, and are at equal distances apart, the distances being equal with the thickness of the type in the box. When the key G is struck, as above described, so that the feed-bar I becomes moved forward, the follower is moved forward the distance of one type, forcing the front type out of the type-box in the groove $a$ into the circumferential groove $b$, and at the backward movement of the feed-bar the tooth next to the one which moved the follower passes under the pawl $s$, ready for the next forward move of the feed-bar. At the forward movement of the follower the spring-pawl $p$ passes out of the hole in the top of the type-box and into the next, preventing the follower from moving backward. As soon as the type has passed into the circumferential groove $b$, it is struck by two arms, $v$ and $w$, which, as the cylinder revolves, move the type onto a guide, K, between two projecting ribs, $x$ $x$, on the sides of the guide. These two ribs project into the groove $b$, and fit in the grooves on the sides of the type. The arms $v$ $w$ only carry the type out to the circumference of the roller, where it remains until the next type forces it further, and so on. The arm $v$ is attached to the feed-bar I, and fits in a recess at the side of the groove $a$, as shown in Fig. 1, from which it emerges at the same time as the type is moved out into the groove $b$, and the backward movement of said feed-bar is so timed that the arm $v$ will have opportunity to carry the type onto the guide K before it passes back into its recess again. The arm $w$ is attached to a wheel or cylinder, L, situated above the main cylinder, and the shaft of which obtains its rotary motion from said main cylinder by means of the cog-wheels M M, as shown in Fig. 3. On the circumference of this cylinder or wheel L are as many of these arms $w$ as there are grooves $a$ in the main cylinder, and the distances between said arms correspond with the distances between the grooves. These arms work in the circumferential groove $b$, and the parts are so arranged that the main cylinder and the wheel L will move exactly at the same speed—that is, each make the same number of revolutions in the same time. The type from the guide K is gradually forced into the form N arranged back of the part A of the cylinder.

In making the main cylinder, the longitudinal groove $d$ of the part $c$ may be opposite any desired point on the part A; but for convenience' sake I prefer to place it opposite the space between the grooves holding the last and first letters or characters used. Then it will readily be seen that more than one key may be struck at the same time, provided the letters or characters so intended to be set come in rotation, because the movement of the type is always on top of the cylinder; for instance, to set the word "boy" the keys representing the letters $b$, $o$, and $y$ may all be struck at one time, and still the type will come out in their regular order. In the word "girl," as another example, the keys representing the letters $g$, $i$, and $r$ may be struck at one time, but the key for the letter $l$ must be struck separately and an instant later.

In all type-setting machines heretofore invented it has only been possible to strike one key at a time, or, in other words, set one letter or type at one time, while, by my construction of the parts, I am enabled, as above stated, to strike more than one key at one time, and hence save time or do more work in the same length of time. It is true the type are not actually set more than one at a time, but the keys or means for setting the type are or may be operated two or more at each revolution of the cylinder. The bed O of the form N slides in guides P P, and may be adjusted to any length desired by means of the screw R, as shown in Fig. 4. The form N consists simply of a bottom plate with vertical partitions forming the spaces between the lines. The end piece of the bed O slides under a rod or bar, $y$, on the outer or rear guide P, and a spring, $z$, surrounding said rod or bar forces the bed and form forward. The bed being moved backward, compressing the spring $z$ until the first space or line of the form is opposite the guide $k$, the type are gradually forced into the same, filling said space, when the bed is moved forward, so that the next line or space comes opposite said guide and becomes filled with type, and so on until the whole form is set up. One side of the guide $k$ has at its rear end a small hinged door, $a'$, opening vertically, and held in place by a spring, $b'$. When this door is in place it completes that side of the guide K, as shown in Fig. 6. If the last type entering any line on the form N should be too wide, and hence not fully enter the form, then when the form moves forward this type, projecting from the form, will open the door $a'$ and move on with the form, while if this door were not there the type or some part of the machine would necessarily break or become injured. The bed O with the form N is held in place by a rod, $d'$, pressed inward by a spring, $e'$, into the space in the form where the types are to enter, and at the opposite end from where they do enter into the same. Between two collars on the rod $d'$ is placed one end of a lever, $f'$, which is pivoted to an arm extending from the outer guide P; and the other end of this lever has an elongated slot, through which a screw passes to pivot it to a slide, $m'$, moving in a groove on the guide P. The same screw passes through and pivots a pawl, $n'$, on the slide $m'$, said pawl having a spring, $i'$, to throw it in proper position.

The type in the space of the form N opposite the guide K press the rod $d'$ outward until, when said space is filled, the rod is entirely pushed out of the form, allowing the spring $z$ to move forward. During the motion of the rod $d'$ the lever $f'$ causes the slide $m'$ to move inward so that the pawl $n'$ will enter one of the unoccupied spaces in the form, and thus form a stop for its forward movement when the rod $d'$ has been pushed entirely out. As soon as the filled space of the form has passed the end of the rod $d'$ the spring $e'$ at once throws it into the next space, and the slide and pawl withdrawn, the spring $i'$ allowing the pawl to yield at the forward movement of the form, and throw the pawl into proper position again when it is withdrawn from the form. These movements are almost instantaneous, so that no stoppage of the machine is necessary during the changing or forward movement of the form.

On the rod $d'$ is also attached a pawl to operate a ratchet-wheel, $p'$, just before the outward motion of the rod is completed; and this ratchet-wheel operates a bell, S, to call the operator's attention to the fact that the line is nearly full, if for any purpose he should desire to stop operations.

Having thus fully described my invention, what I claim as new, and desire to secure by Letters Patent, is—

1. In a type-setting machine, the combination of a revolving cylinder with longitudinal grooves to carry the type and a circumferential groove to receive the type, a mechanism to move the type from the longitudinal to the circumferential groove, and a mechanism to move the type out of the circumferential groove and from the cylinder, substantially as and for the purposes herein set forth.

2. In a type-setting machine, the combination of a revolving cylinder with type-carrying grooves and a type-receiving groove, substantially as described, a mechanism to move the type from the carrying to the receiving groove, operated by a stationary key-board, and a mechanism to move the type from the receiving-groove and from the cylinder, substantially as and for the purposes herein set forth.

3. In a type-setting machine, the combination of a revolving cylinder with longitudinal grooves to carry the type and a circumferential groove to receive the type, a mechanism to move the type from the longitudinal to the circumferential groove, a mechanism to move the type out of the circumferential groove and from the cylinder, and an automatically-moving form to receive the type, substantially as and for the purposes herein set forth.

4. The part A of the revolving cylinder provided with a series of longitudinal type-carrying grooves, $a$ $a$, and a single circumferential groove, $b$, into which the type are moved from the longitudinal grooves, all substantially as herein set forth.

5. The part C of the revolving cylinder provided with a single longitudinal groove, $d$, and a series of circumferential grooves, $e$ $e$, each having side grooves and notches, substantially as herein described, and for the purposes set forth.

6. The arrangement of the key G with lug $f$, and the bar H with lug $h$, having flanges $i$ $i$, and used in combination with the grooves $d$ $e$ of the revolving cylinder and the spring $n$, substantially as and for the purposes herein set forth.

7. The combination of the feed-bar I having teeth $t$ $t$, projection $k$, and spring $m$, the type-box E with longitudinal ribs or grooves $o$ and perforations at the top, and the follower J with spring-pawls $p$ $s$, all substantially as and for the purposes herein set forth.

8. The arm $v$ upon the feed-bar I, in combination with the arm $w$ on the revolving wheel or cylinder L for carrying the type out of the groove $b$, substantially as herein set forth.

9. The guide K provided with ribs $x$ $x$, projecting into the groove $b$ on the revolving cylinder, substantially as and for the purposes herein set forth.

10. The adjustable bed O, in combination with form N, moved forward on the guides P P by the spring $z$, substantially as and for the purposes herein set forth.

11. The combination, with the form N, of the rod $d'$, spring $e'$, lever $f'$, slide $m'$, pawl $n'$, and spring $i'$, constructed and arranged to operate substantially as and for the purposes herein set forth.

In testimony that I claim the foregoing I have hereunto set my hand this 25th day of May, 1872.

CHAS. T. MOORE.

Witnesses:
C. L. EVERT,
ROLLIN WHITE.